United States Patent [19]

Yamauchi et al.

[11] Patent Number: 5,278,005
[45] Date of Patent: Jan. 11, 1994

[54] ELECTROCHEMICAL CELL COMPRISING DISPERSION ALLOY ANODE

[75] Inventors: Goro Yamauchi, Tokyo, Japan; Fred Laman, Burnaby; Kunio Moriya, Vancouver, both of Canada

[73] Assignee: Advanced Energy Technologies Inc., Burnaby, Canada

[21] Appl. No.: 864,266

[22] Filed: Apr. 6, 1992

[51] Int. Cl.$^5$ .............................................. H01M 6/14
[52] U.S. Cl. ..................................... 429/194; 429/218
[58] Field of Search ............... 429/218, 194, 196, 197, 429/199, 252, 254; 420/400

[56] References Cited

U.S. PATENT DOCUMENTS

| | | | |
|---|---|---|---|
| 3,639,174 | 1/1972 | Kegelman | 136/20 |
| 3,980,498 | 9/1976 | Urbach et al. | 429/64 |
| 4,324,846 | 4/1982 | Kaun et al. | 429/112 |
| 4,434,213 | 2/1984 | Niles et al. | 429/3 |
| 4,489,143 | 12/1984 | Gilbert et al. | 429/103 |
| 4,626,335 | 12/1986 | Cupp et al. | 204/293 |
| 4,632,889 | 12/1986 | McManis et al. | 429/218 |
| 4,645,726 | 2/1987 | Hiratani et al. | 429/191 |
| 4,652,506 | 3/1987 | Bélanger et al. | 429/192 |
| 4,794,060 | 12/1988 | Bélanger et al. | 429/209 |
| 4,814,240 | 3/1989 | Zaromb | 429/15 |
| 4,820,599 | 4/1989 | Furukawa et al. | 429/194 |
| 4,844,996 | 4/1989 | Peled et al. | 429/194 |
| 4,849,309 | 7/1989 | Redey et al. | 429/50 |
| 4,865,932 | 9/1989 | Masuda et al. | 429/194 |
| 4,874,680 | 10/1989 | Koshiba et al. | 429/197 |
| 4,925,751 | 5/1990 | Shackle et al. | 429/191 |
| 4,996,129 | 2/1991 | Tuck | 429/194 |
| 5,013,620 | 5/1991 | Miyazaki et al. | 429/218 X |

FOREIGN PATENT DOCUMENTS

| | | | |
|---|---|---|---|
| 833132 | 1/1970 | Canada | 319/36 |
| 840548 | 1/1970 | Canada | 319/95 |
| 939430 | 1/1974 | Canada | 319/33 |
| 1032066 | 6/1978 | Canada | 148/10 |
| 1042503 | 11/1978 | Canada | 319/83 |
| 1052443 | 4/1979 | Canada | 319/34 |
| 1062775 | 9/1979 | Canada | 319/82 |
| 1070760 | 1/1980 | Canada | 319/83 |
| 1077560 | 5/1980 | Canada | 319/84 |
| 1086988 | 10/1980 | Canada | 319/83 |
| 1095585 | 2/1981 | Canada | 319/33 |
| 1104203 | 6/1981 | Canada | 319/83 |
| 1111673 | 11/1981 | Canada | 75/120 |
| 1222543 | 6/1987 | Canada | 319/83 |
| 1244301 | 11/1988 | Canada | 319/83 |
| 1258107 | 8/1989 | Canada | 319/33 |
| 1266880 | 3/1990 | Canada | 319/83 |
| 0281352 | 9/1988 | European Pat. Off. | |

OTHER PUBLICATIONS

Desjardins, MacLean—A review of the lithium negative electrode (date unknown).

Primary Examiner—Anthony Skapars
Attorney, Agent, or Firm—Browdy and Neimark

[57] ABSTRACT

An anode material for use in lithium based electrical cells is described. The anode material comprises a fine and uniform dispersion of second phase particles in lithium. The particles have an average particle size from about 0.5 $\mu M$ to about 40 $\mu M$ and are present at a concentration ranging from about 0.1 at % to about 10 at %. The anode material exhibits a reduction in dentrite and mossy Li formation, while maintaining the necessary mechanical properties of the material for easy working. The new anode demonstrates excellent cell performance and thermal stability.

14 Claims, 4 Drawing Sheets

Li ALLOY

Li

Li ALLOY

Li

ELECTROCHEMICAL CELL COMPRISING DISPERSION ALLOY ANODE

BACKGROUND OF INVENTION

This invention relates to the use of lithium alloy as an anode material in rechargeable high energy density batteries.

The cycle life and thermal safety properties of lithium rechargeable batteries are dependent on the lithium anode. The lithium anode fails most often because of the formation of dendritic and mossy lithium on the anode surface upon charging. The dendrite penetrates the separator between the anode and the cathode, which causes electrical shorting, reducing the cycle life of the cell. Mossy lithium is composed of many tiny lithium particles. The total surface area of the mossy lithium is large and very active, providing a source of thermal instability. The mossy lithium initiates temperature increases, when some trigger reaction is applied, which leads to thermal instabilities of the cell.

Several approaches for overcoming these problems have been developed. Initially, cell separators were used to minimize the effects of dendrite growth. However, cell separators are only effective initially, for the dendrites will eventually penetrate the separators and establish electronic shorts.

Lithium-Aluminum high concentration alloys have been investigated to avoid the above mentioned problems. There are two methods to prepare Lithium-Aluminum high concentration alloys. One is a powder metallurgical method and the other is an electrochemical method. For example, U.S Pat. No. 4,002,492 describes a powder metallurgical method of preparing Lithium-Aluminum alloys containing from about 63% to about 93% Lithium on an atomic basis. In this U.S. patent the Lithium alloy is made by sintering, by which process it is impossible to make a ductile and thin Li alloy sheet. Similarly, Japanese patent Tokkai-Sho-63-146351 describes an electrochemical method of preparing Lithium-Aluminum alloys. In these alloys, however, loss of capacity is inevitable and they are too fragile and brittle to wind cylindrical cells.

Composite electrodes comprised of a lithium-lithium nitride alloy as disclosed in European Patent Application 88301752 have also been developed. However, this alloy is hard to work, which makes it very difficult to prepare lithium-lithium nitride alloy foil for small cells, such as AA size cells.

There are several patents which describe lithium anodes with metallic material. For example, U.S. Pat. No. 4,434,213 describes a lithium anode having an aluminum-magnesium cladding. U.S. Pat. Nos. 4,652,506 and 4,794,060 describe an anode with a thin metallic foil of aluminium, magnesium and/or tin. U.S. Pat. No. 4,626,335 discloses a lithium aluminum anode with metal binder particles of unalloyed iron, copper, nickel or manganese. The main advantage sought by adding metallic elements is to disperse the dendrite growth points so that the growth of the dendrite is prevented and penetration of the dendrite through a separator, which is one of the causes of anode deterioration, does not occur. However, the formation of dendrites is only slowed down and not prevented by these new alloys.

The present invention attempts to further improve the prevention of dendritic growth while maintaining the necessary mechanical properties of the material for easy working. The new lithium alloy anode, according to the present invention demonstrates excellent cell performance and thermal stability.

SUMMARY OF THE INVENTION

It has been found that the above mentioned problems with anodes can be reduced or avoided by the use of lithium dispersion alloy anode. Accordingly, this invention is directed to lithium based electrical cells having a new anode material, which comprises a fine and uniform dispersion of particles in the lithium. The lithium dispersion alloy anode, according to the present invention, can be used to replace lithium anodes which are presently used in lithium based electrical cells.

The lithium dispersion alloy anodes, made according to this invention, can be used in lithium based-electrochemical cells without modifying the cell's remaining elements, such as the cathode, separator, and electrolyte. These elements have been described in the literature directed to lithium rechargeable batteries.

According to the present invention the dispersion particles, or second phase particles are, selected from the group consisting of: second phase particles in the Li rich region of Li-Al alloys, which are referred herein as $Al_4Li_9$ (according to the phase diagram in "The Handbook of Binary Phase Diagrams" by Dr. William G. Moffat, Genium Publishing Co., 1986), however are also referred to in the art as $Li_2Al$; $ZrO_2$; $CaO$; $BeO$; $MgO$; $Li_3Bi$; $Li_3Cd$; $LiIn$; $Li_{22}Pb$; $Li_{22}Pb_5$; $Li_5Pd$; $Li_3Pt$; $LiPu$; $LiRh$; $LiRu_3$; $Li_2S$; $Li_3Sb$; $Li_2Se$; $Li_{22}Si_5$; $Li_{22}Sn_5$; $Li_{23}Sr_6$; $Li_2Te$; $LiZn$; $Cu$; $Na$; $Ni$; $Mo$; $Ti$; $Os$; and $Zr$; wherein the average particle size is from about 0.5 $\mu M$ to about 40 $\mu M$ and the particles are present at a concentration ranging from about 0.1 at % to about 10 at %.

According to the present invention there is provided an anode for use in an electrochemical cell, wherein said anode is comprised of an alloy of Li and a fine and uniform dispersion of second phase particles, and wherein said particles have an average size from about 0.5 $\mu M$ to about 40 $\mu M$ and comprise from about 0.1 at % to about 10 at % of the alloy.

Further according to the present invention there is provided process for preparing a lithium dispersion alloy anode comprising:

a) melting the lithium and second phase particle together, to form a fine dispersion of particles in the molten solution, b) cooling the molten solution to freezing, to form an ingot; and c) mechanically working said ingot to produce a thin Li alloy foil; wherein said alloy contains a fine and uniform dispersion of said particles.

In a further embodiment of the present invention there is provided an electrochemical cell comprising:

a) an Li - alloy anode comprised of Li and a fine and uniform dispersion of second phase particles; wherein said particles have an average size from about 0.5 $\mu M$ to about 40 $\mu M$ and comprise from about 0.1 at % to about 10 at % of the alloy.

b) a cathode, c) a non-aqueous electrolyte comprising a solvent and a lithium salt dissolved therein, and d) a porous separator.

DETAILED DESCRIPTION OF THE PREFERRED EMBODIMENTS

Figure 1:
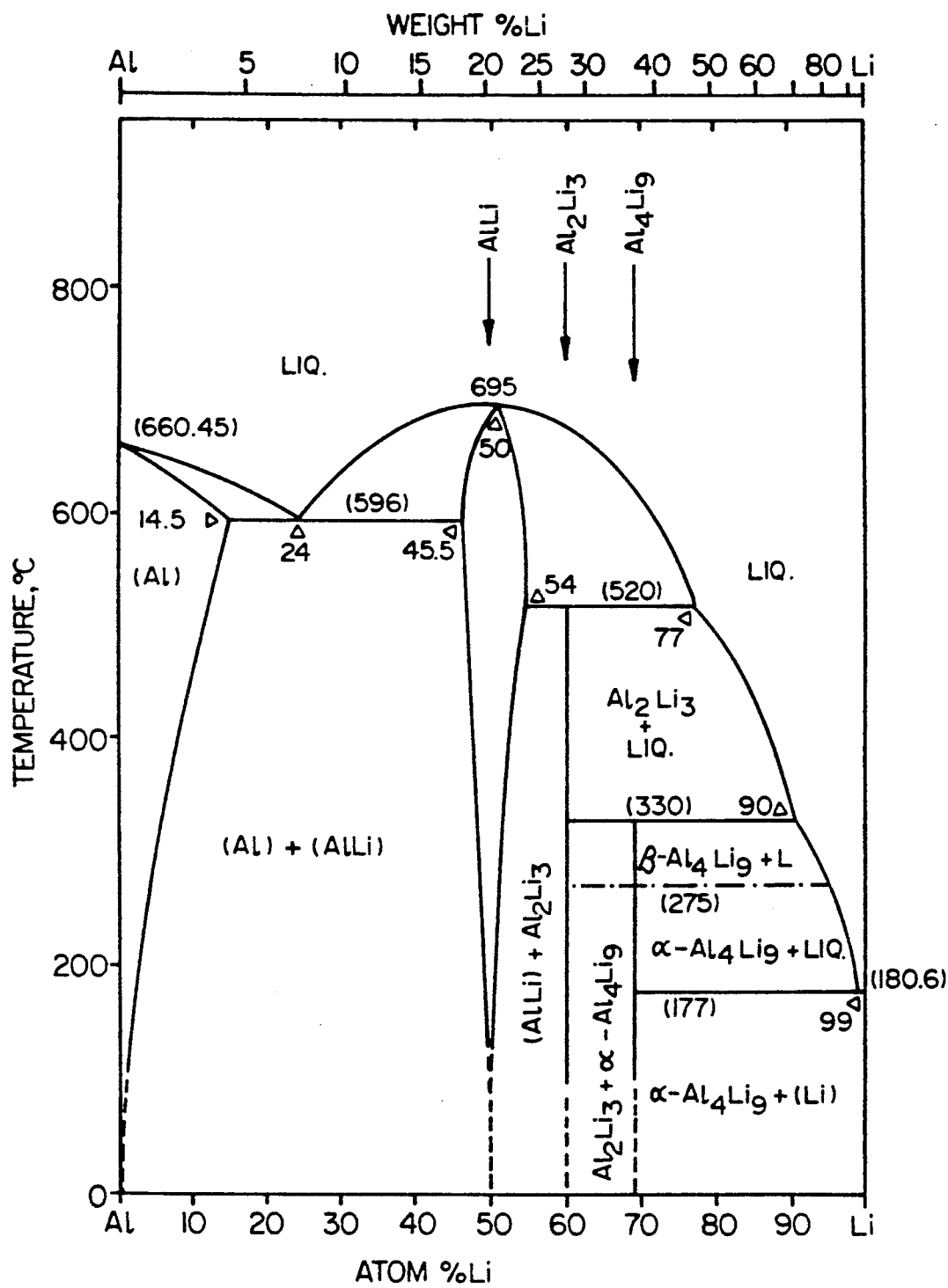
FIG. 1 shows a phase diagram of lithium and aluminum.

Reduction in dendrite formation or mossy Li formation was accomplished by addressing the following three items:

(1) increasing the stack pressure by increasing the mechanical strength of the anode material;

(2) increasing the active points from which dendrite growth initiates; and (3) forming many, but shallow pits, on discharge. The basis for addressing these items follows.

(1) Increase the stack pressure by increasing the mechanical strength of the anode material.

U.S. Pat. 4,587,182 indicates that increasing the stack pressure on the anode is known to decrease the dendrite formation and the mossy Li formation. If the anode material is mechanically strengthened, increased stack pressure can be applied on the anode material, especially in a cylindrical cell. According to the present invention, the mechanical strength of the anode material has been increased, as follows;

(a) By choosing a Li- dispersion alloy as anode material, the mechanical strength of the anode material is improved by the existence of particles dispersed in the alloy on the basis of the dispersion hardening effect. This effect is enhanced by a fine and the uniform dispersion of particles in the alloy. To achieve this fine and uniform dispersion of the particles mentioned herein, rapid cooling of the molten Li- dispersion alloy followed by cold working with high reduction in area is preferred.

(b) By cold or warm working of Li- dispersion alloy with high reduction in area, the mechanical strength of the alloy is improved on the basis of work hardening effect.

Increasing the mechanical strength of the alloy has the additional advantage of ensuring a constant thickness of the anode materials, which results in uniformity of the cell produced.

(2) Increasing the active points from which dendrite growth initiates.

The crystal growth or dendrite growth starts at a localized high dislocation density (more than $10^{10}$ $cm^{-2}$) area as described in "Introduction to Surface Physics" by M. Maeda published in 1970. This localized high dislocation density area is called an active point. The active points correspond to the positions of dispersed particles in Li metal matrix, as the interfaces between particles and Li metal matrix are the areas where the density of dislocations is high. If the density of active points or the density of the dispersed particles on the surface of the anode material is small, relatively tall dendrites grow, which penetrate the separator causing the shorting of the cell, resulting in short cycle life. On the other hand, if the density of the active points or the density of the dispersed particles is large, short dendrites grow. These dendrites cause less stress compared with tall dendrites. Thus, short dendrites formed on the anode surface, with high density of active points or high density of the dispersed particles, will not penetrate the separator and therefore not cause shorting, resulting in longer cycle life of the cell.

Therefore, increasing the active points, by the fine and uniform dispersion of the second phase particles in the Li - alloy results in increasing the cycle life of the cell. The methods used to increase the active points is similar to the methods used to increase the mechanical strength of the anode materials, described in above (1) (a)-(b). Increasing the mechanical strength of the anode material is accompanied by an increase in the active points, from which the dendrite growth initiates.

(3) Forming many but shallow pits on discharge.

If the depth of the pits formed on discharge is shallow, the deposited Li in the pits is compressed with higher stack pressure compared with those in the deep pit. The total amount of Li removed on discharge is constant. Therefore the more pits are made on discharge, the shallower the depth of the pits. For this purpose, forming many pits on discharge is preferred.

The methods used to create numerous pits on discharge is similar to the methods for increasing the mechanical strength of the anode materials, as described above in (1) (a)-(b). The pits are formed by the Li ion dissolving from the active points, or the high density dislocation areas, which are formed by dispersing the second phase or the cold or warm working process of the anode materials, as described above. The density of the dislocations is highest in the interface between particles and matrix Li. Therefore the dissolution of Li ions initiates mainly from the interface of the dispersed particles.

Thus, according to the present invention, a fine and uniform dispersion of the particles in the Li anode is preferred. In the present Li - dispersion alloy anode, relatively small amounts of particles are finely and uniformly dispersed in the Li matrix. The particles which can be used according to the present invention, include $Al_4Li_9$, sometimes referred to in the art as $Li_2Al$; $ZrO_2$; CaO; BeO; MgO; $Li_3Bi$; $Li_3Cd$; LiIn; $Li_4Pb$; $Li_{22}Pb_5$; $Li_5Pd$; $Li_3Pt$; LiPu; LiRh; $LiRu^3$; $Li_2S$; $Li_3Sb$; $Li_2Se$; $Li_{22}Si_5$; $Li_{22}Sn_5$; $Li_{23}Sr_6$; $Li_2Te$; LiZn; Cu; Na; Ni; Mo; Ti; Os; and Zr, wherein the average particle size is from about 0.5 $\mu M$ to about 40 $\mu M$, wherein the preferred range is from about 2 $\mu M$ to about 10 $\mu M$, and the particles are present at a concentration ranging from about 0.1 at % to about 10 at %, with a preferred range from about 0.2 at % to about 5 at %. In the preferred anode of the present invention, the Li anode contains a fine and uniform dispersion of particles of $Al_4Li_9$.

Most applications of lithium aluminum alloys as rechargeable battery anodes have focused on 50 at %Li and 50 at % Al (see FIG. 1 for phase diagram of Lithium and Aluminum). In such high concentration alloys, the whole alloy is composed of LiAl intermetallic compound and it is difficult to fabricate Li alloy foils for cylindrical cells, because this intermetallic compound is very brittle. Furthermore, the macroscopic shape change of the alloy anode is inevitable.

In the Li - dispersion alloy, of the present invention, relatively small amount of particles are finely and uniformly dispersed in the Li matrix. Therefore plastic deformation of the alloy is possible because of the existence of the Li matrix. The mechanical strength of the alloy is improved by the dispersion hardening effect caused by the existence of the dispersed particles, and by the work hardening effect in the working process. The improvement of the mechanical properties make it possible to get the high stacking pressure on the anode surface, which reduces the dendrite formation. Furthermore, by increasing the mechanical properties of the anode material, the creep effect of anode material is prevented, improving the quality control of the anode material.

In addition, the dispersion of the fine particles can improve the safety properties of the cell, by reducing the height of the dendrite and reducing the depth of the pit holes, as discussed above.

The lithium dispersion alloy anodes, made according to this invention, can be used in lithium based-electrochemical cells without modifying the cell's remaining elements, such as the cathode, separator, and electrolyte. These elements have been described in the literature directed to lithium rechargeable batteries. For example the porous separator can be made from polypropylene, polyethylene or a glass microfiber material.

The electrolyte is generally a non-aqueous electrolyte comprising a solvent and a lithium salt dissolved therein. The solvent is preferably selected from: ethers, esters, dioxolanes, furans and glymes such as propylene-carbonate, ethylene carbonate or monoglyme. The lithium salt generally has an anion selected from halide ions, hexafluorometallate ions, tetrafluorometallate ions, perchlorate ions, sulfonate ions, borate ions, thiocyanate ions, aluminate ions, closoborane ions and derivatives thereof.

The active material of the cathode comprises a chalcogen or chalcogenide compound of a transition metal or lithiated compounds of these materials such as lithiated $MoS_2$ or $TiS_2$. Furthermore, the cathode is selected from a substance selected a halogen, a halide, a metal oxide, a sulphide, a selenide, an oxyhalide, sulfur dioxide and carbon or Lithiated compounds of these materials such as amorphous $V_2O_5$, Lithiated $MnO_2$, $LiNiO_2$, $LiCoO_2$, or $LiCo_xNi_{(1-x)}O_2$.

Anode material according to the invention can be prepared by melting lithium metal and the appropriate dispersion particles in a crucible in an argon filled dry box to form a particle dispersed molten solution. The molten solution is rapidly cooled to freeze. Then the ingot is worked with high reduction of cross sectional area so that a fine and uniform dispersion of particles is realized, in a thin Li alloy anode foil. The foil is then used for the anode of Li rechargeable batteries. According to the present invention the anode is worked to a thin foil from about 50 $\mu$M to about 250 $\mu$M, with a preferred thickness ranging from about 100 $\mu$M to about 150 $\mu$M. In a preferred embodiment of the present invention the Li alloy anode foil is about 127 $\mu$M.

While this invention is described in detail with particular reference to certain preferred embodiments thereof, the following example is offered to illustrate but not limit the invention.

EXAMPLES

Li-Al$_4$Li$_9$ ALLOY ANODE

The Li-Al$_4$Li$_9$ alloy anode material according to this example can be prepared by melting 600 grams of lithium metal and 26 grams of aluminum metal in a crucible in an argon filled dry box at a temperature above the liquidus line of the phase diagram of Li-Al shown in FIG. 1. The molten solution is rapidly cooled to freezing so that the fine structure of Al$_4$Li$_9$ intermetallic compound is formed. The ingot is then worked to obtain a Li alloy anode foil, approximately 127 $\mu$M thick, through high reduction of cross sectional area so that a fine and uniform dispersion of Al$_4$Li$_9$ particles is realized. This alloy foil was used for the anode of Li rechargeable batteries.

Figure 2:
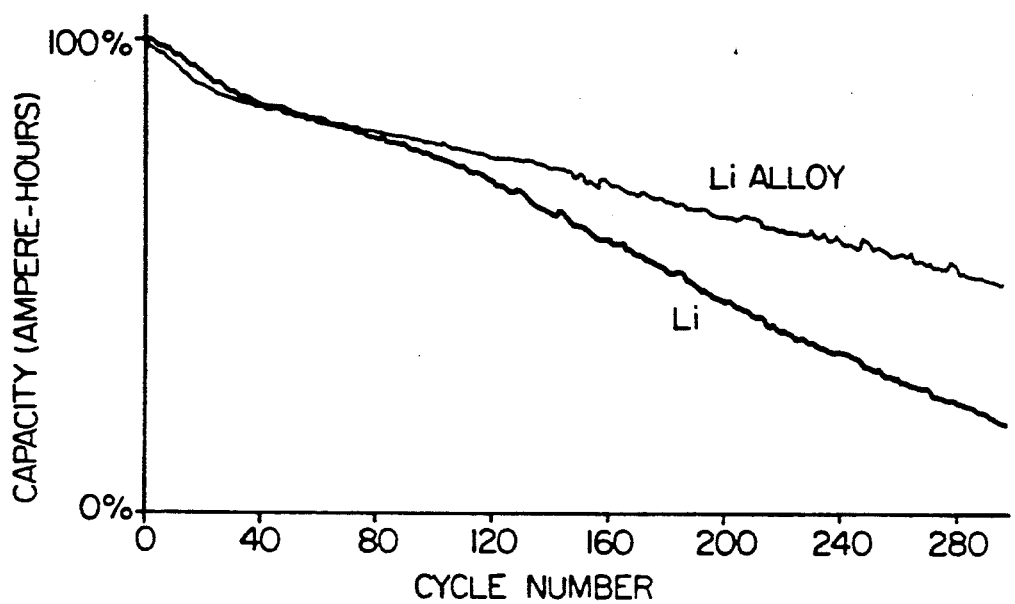
FIG. 2 shows a comparison of cycle life between a pure lithium anode cell and the Li dispersion alloy anode cell, produced according to Example 1, with a lithiated $MnO_2$ cathode.

FIG. 2 shows the comparison of cycle life between pure lithium anode and the lithium dispersion alloy anode, comprising 1 at % Al, in AA size cylindrical cells. In this case, the cathode active material is lithiated $MnO_2$, the separator is micro porous polypropylene and the electrolyte is a mixture of ethylene carbonate and propylene carbonate with 1 mol LiAsF$_6$ salt. The cycling condition is as follows: discharge current is 600 mA down to 2.0 V, charge current is 100 mA up to 3.5 V.

The superiority of the lithium alloy anode, as compared to the pure lithium anode is first apparent from about the 100$^{th}$ cycle. The ultimate cycle life of an anode is defined as the cycle when the capacity of the cell falls to 50% of its initial capacity. Accordingly, as shown in FIG. 2 the cycle life of the pure lithium anode is less than 200, whereas the cycle life of the lithium alloy anode, of this example, is more than 300. These results show the excellent cell property of the Li - Al$_4$Li$_9$ alloy anode.

Figure 3:
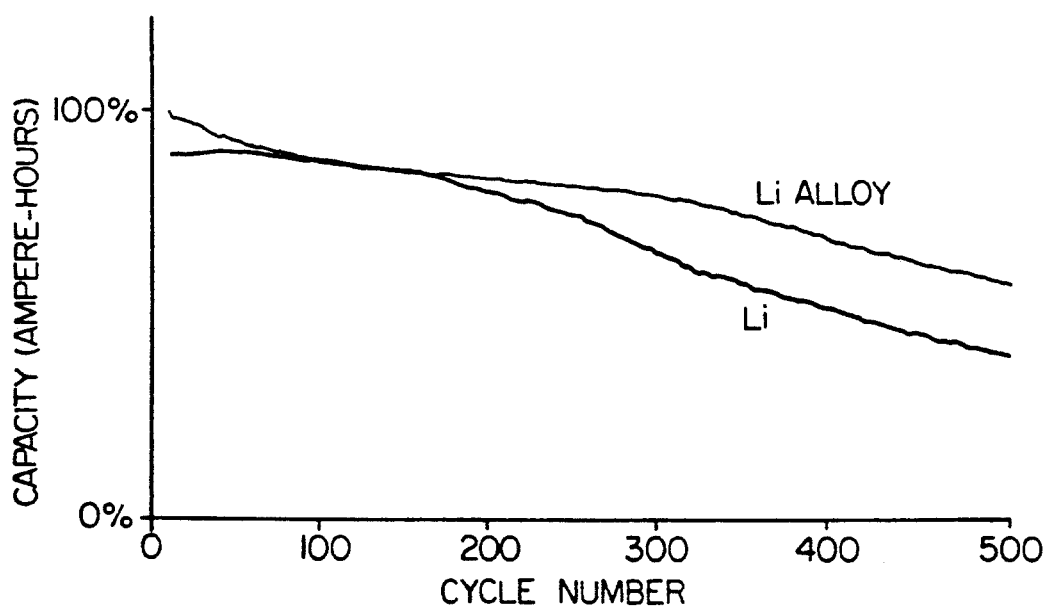
FIG. 3 shows a comparison of cycle life between a pure lithium anode cell and the Li dispersion alloy anode cell, produced according to Example 1, with a $MOS_2$ cathode.

FIG. 3 shows the comparison of cycle life between the pure lithium anode and the lithium dispersion alloy, of the present example, in cylindrical cells. In this case, the cathode active material is $MoS_2$, the separator is micro porous polypropylene and the electrolyte is a mixture of ethylene carbonate and propylene carbonate with 1 mol LiAsF$_6$ salt. The cycling condition is as follows: discharge current is 600 mA down to 1.3 V and charge current is 100 mA up to 2.2 V. The cell with the dispersion alloy anode shows superior cycle life, as demonstrated in FIG. 3. The ultimate cycle life for this Li alloy anode was about 600, as compared to about 400 for the pure Li anode.

Table 1 shows comparisons of the thermal safety between a pure lithium anode cell and the Li-dispersion alloy anode of the present example, with a $V_2O_5$ cathode. Cylindrical cells, precycled for 25 cycles, are placed in an incubator, which is held at 120° C. or 130° C. Precycling of the cells is done at room temperature with cells discharged at 0.2 mA/cm$^2$ to 1.5 V and charged at 0.4 mA/cm$^2$ to 3.3 V. During the exposure to incubated temperatures of 120° C. or 130° C., self-heating will occur as a result of exothermic reactions between anode and electrolyte. In this case the temperature of the cell will rise above the incubated temperature. Depending on the temperature and on the kind of anode material i.e., pure Li or the Li dispersion alloy, venting with flames may occur. Table 1 shows that the cell with the pure lithium anode causes violent venting, with flames in the 130° C. hot box test. On the contrary, no venting occurred in the 130° C. hot box test for the cell with the dispersion alloy anode. This shows that replacing the Lithium metal anode by the dispersion alloy anode increases the thermal stability of the cell.

TABLE 1

| Temperature | Pure Li | Li—Al$_4$Li$_9$ Alloy |
|---|---|---|
| 120° C. | No vent | No vent |
| 130° C. | Violent venting with flames | No vent |

Figure 4A:
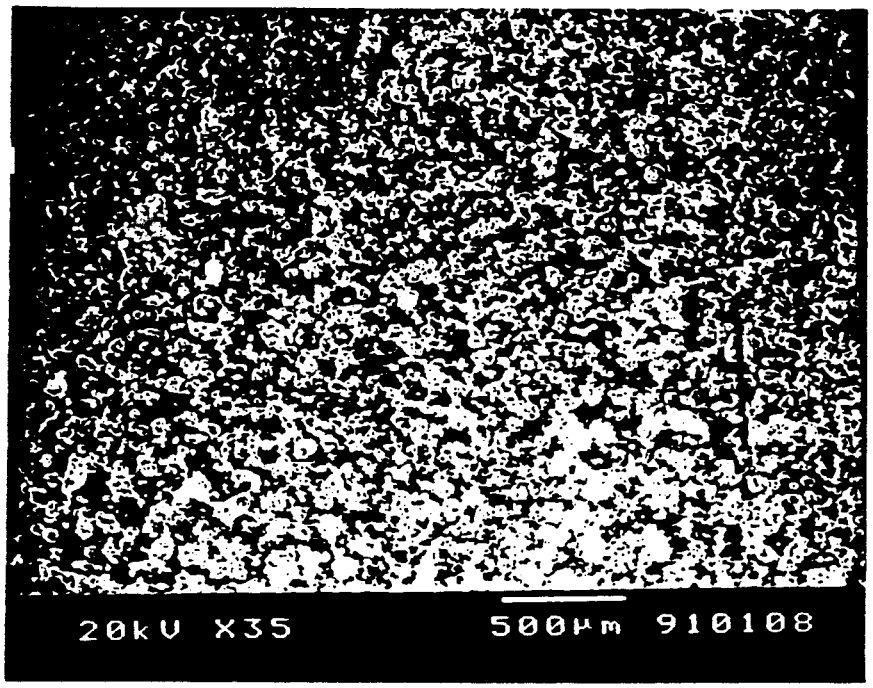
FIG. 4 shows a comparison between a pure lithium anode and the Li dispersion alloy anode, of Example 1, after one cycle of discharge and charge with a $V_2O_5$ cathode, using a Scanning Electron Microscope.
Figure 4B:
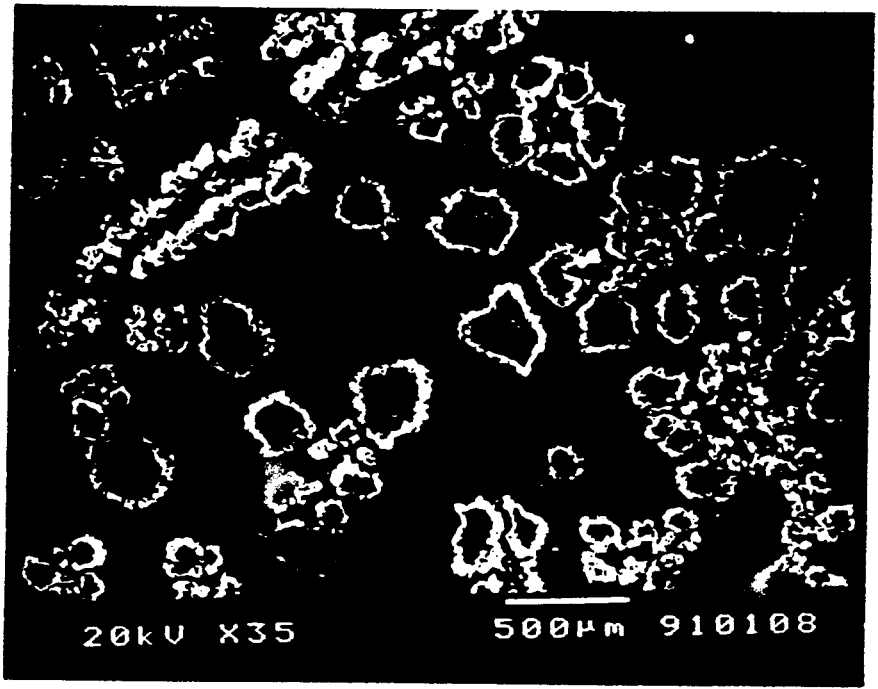
Figure 5A:
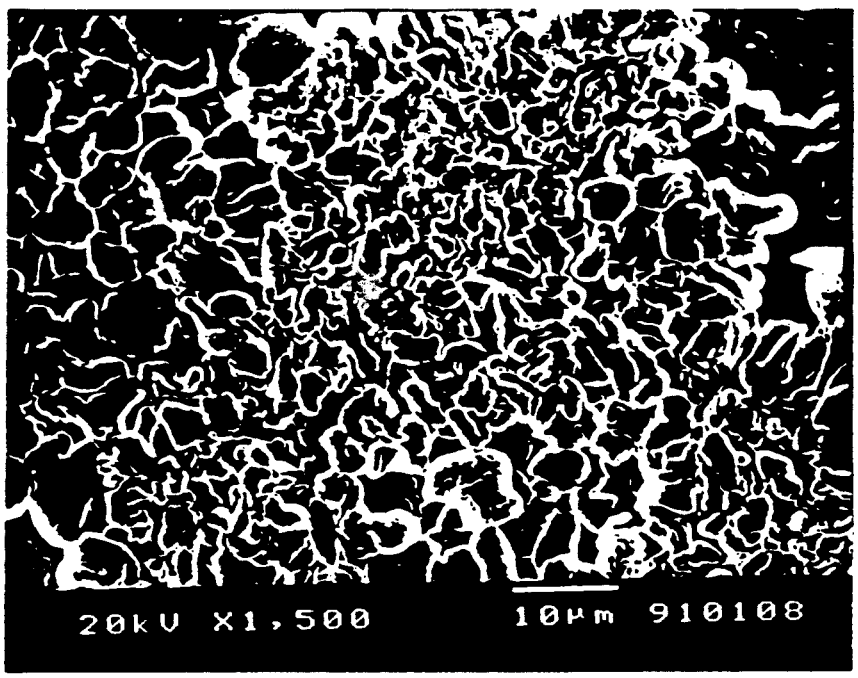
FIG. 5 shows the high magnification photographs of FIG. 4.
Figure 5B:
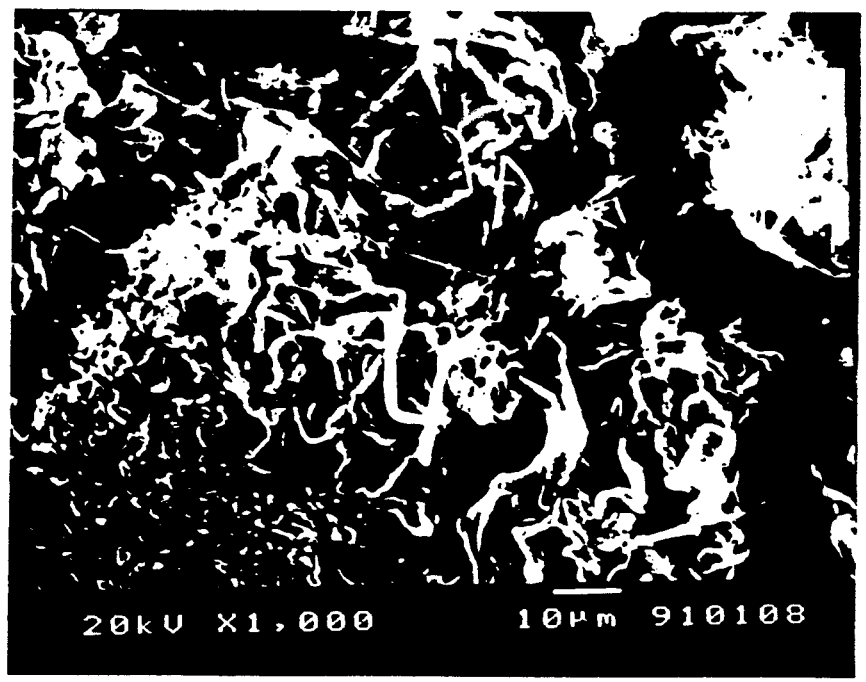

FIG. 4 and FIG. 5 show a comparison of Scanning Microscope Observations, between pure lithium anode and the dispersion alloy anode of the present example with a V$_2$O$_5$ cathode, after one cycle of 0.16 mA/cm$^2$ discharge to 2.5 V and 0.32 mA/cm$^2$ charge to 3.5 V. As shown in FIG. 4, more fine and uniform pits, filled with cycled lithium, are observed in the alloy anode compared with the pure lithium anode. FIG. 5 provides evidence that the needle-like dendrite formation is prevented and that deposited Li is compacted by high stacking pressure on the surface of the Li dispersion alloy anode. Accordingly, the cell, as produced according to the present invention, achieves a longer cycle life and is safer than the cell comprising pure Lithium as an anode.

While the present invention has been described in connection with a specific embodiment thereof and in a specific use, various modifications will occur to those skilled in the art without departing from the spirit and scope of the invention as set forth in the appended claims.

The embodiments of the invention in which an exclusive property or privilege is claimed are defined as follows:

1. An electrochemical cell comprising:
   a) an Li - alloy anode comprised of Li and a fine and uniform dispersion of second phase particles; wherein said particles have an average size from about 0.5 µM to about 40 µM and comprise from about 0.1 at % to about 5 at % of the alloy.
   b) a cathode,
   c) a non-aqueous electrolyte comprising a solvent and a lithium salt dissolved therein, and
   d) a porous separator.

2. An electrochemical cell according to claim 1 wherein the second phase particles are selected from the group consisting of: Al$_4$Li$_9$; Li$_2$Al; ZrO$_2$; CaO; BeO; MgO; Li$_3$Bi; Li$_3$Cd; LiIn; Li$_4$Pb; Li$_{22}$Pb$_5$; Li$_5$Pd; Li$_3$Pt; LiPu; LiRh; LiRu$_3$; Li$_2$S; Li$_3$Sb; Li$_2$Se; Li$_{22}$Si$_5$; Li$_{22}$Sn$_5$; Li$_{23}$Sr$_6$; Li$_2$Te; LiZn; Cu; Na; Ni; Mo; Ti; Os; and Zr.

3. An electrochemical cell according to claim 2, wherein the second phase particles are Al$_4$Li$_9$.

4. An electrochemical cell according to claim 1, wherein the Li alloy anode is formed into a thin foil with a fine and uniform dispersion of second phase particles.

5. An electrochemical cell according to claim 1, wherein said porous separator is selected from the group consisting of: polypropylene, polyethylene and glass microfiber material.

6. An electrochemical cell according to claim 1, wherein said lithium salt has an anion selected from the group consisting of: halide ions, hexafluorometallate ions, tetrafluorometallate ions, perchlorate ions, sulfonate ions, borate ions, thiocyanate ions, aluminate ions, closoborane ions and derivatives thereof.

7. An electrochemical cell according to claim 1, wherein said solvent is selected from the group consisting of ethers, esters, dioxolanes, furans and glymes.

8. An electrochemical cell according to claim 7, wherein the glymes are selected from the group consisting of: propylenecarbonate, ethylene carbonate and monoglyme.

9. An electrochemical cell according to claim 1, wherein the cathode active material is selected from the group consisting of: a chalcogen compound of a transition metal, a chalcogenide compound of a transition metal, lithiated compounds thereof.

10. An electrochemical cell according to claim 9, wherein the lithiated compounds are selected from the group consisting of lithiated MoS$_2$ and lithiated TiS$_2$.

11. An electrochemical cell according to claim 1, wherein said cathode comprises a substance selected from the group consisting of: halogen, halide, metal oxide, sulphide, selenide, oxyhalide, sulfur dioxide and carbon.

12. An electrochemical cell comprising:
   a) an Li - alloy anode comprised of Li and a fine and uniform dispersion of second phase particles; wherein said particles have an average size from about 0.5 µM to about 40 µM and comprise from about 0.1 at % to about 5 at % of the alloy; and wherein said particles are selected from the group consisting of: Al$_4$Li$_9$; Li$_2$Al; ZrO$_2$; CaO; BeO; MgO; Li$_3$Bi; Li$_3$Cd; LiIn; Li$_4$Pb; Li$_{22}$Pb$_5$; Li$_5$Pd; Li$_3$Pt; LiPu; LiRh; LiRu$_3$; Li$_2$S; Li$_3$Sb; Li$_2$Se; Li$_{22}$Si$_5$; Li$_{22}$Sn$_5$; Li$_{23}$Sr$_6$; Li$_2$Te; LiZn; Cu; Na; Ni; Mo; Ti; Os; and Zr;
   b) a cathode comprising a substance selected from the group consisting of: halogen, halide, metal oxide, sulphide, selenide, oxyhalide, sulfur dioxide and carbon; and, a cathode active material comprising a chalcogen compound of a transition metal; a chalcogenide compound of a transition metal; and lithiated compound thereof;
   c) a non-aqueous electrolyte comprised of a solvent selected from the group consisting of ethers, esters, dioxolanes, furans, and glymes and a lithium salt, wherein said lithium salt has an anion selected from the group consisting of: halide ions, hexafluorometallate ions, tetrafluorometallate ions, perchlorate ions, sulfonate ions, borate ions, thiocyanate ions, aluminate ions, closoborane ions and derivatives thereof; and,
   d) a porous separator comprised of a material selected from the group consisting of: polypropylene, polyethylene, and glass microfiber.

13. An electrochemical cell according to claim 12, wherein the second phase particles are Al$_4$Li$_9$.

14. An electrochemical cell according to claim 12, wherein the Li alloy anode is formed into a thin foil with a fine and uniform dispersion of second phase particles.

* * * * *